United States Patent [19]
Curry et al.

[11] Patent Number: 5,293,729
[45] Date of Patent: Mar. 15, 1994

[54] PIVOT MECHANISM FOR REEL MOWER CUTTING UNITS

[75] Inventors: Roger W. Curry, Horicon; Robert F. Hartwig, both of Horicon; Christopher S. Thorman, Beaver Dam; Frank K. O'Toole, West Bend, all of Wis.

[73] Assignee: Deere & Company, Moline, Ill.

[21] Appl. No.: 957,583

[22] Filed: Oct. 7, 1992

[51] Int. Cl.$^5$ .................. A01D 75/30; A01D 34/44
[52] U.S. Cl. .......................................... 56/7; 56/15.8
[58] Field of Search ............... 56/7, 14.9, 15.6, 15.7, 56/15.8, 249, DIG. 3, DIG. 10

[56] References Cited

U.S. PATENT DOCUMENTS

| | | | |
|---|---|---|---|
| 2,764,864 | 10/1956 | Kinkead | 56/7 |
| 3,154,903 | 11/1964 | Smith | 56/15.8 |
| 4,478,026 | 10/1984 | Mullet et al. | 56/7 |
| 4,688,375 | 8/1987 | Mattson | 56/7 |
| 4,769,976 | 9/1988 | Basset et al. | 56/7 |
| 4,866,917 | 9/1989 | Phillips et al. | 56/7 |
| 5,042,236 | 8/1991 | Lamusga et al. | 56/7 |

OTHER PUBLICATIONS

Brochure entitled "John Deere 2243 Professional Greens Mower", published by Deere & Co. in 1990, pp. 1–4.
Brochure entitled "Toro, What Mower Give Greens the Kindest Cut of All?", published by The Toro Company, in 1989, pp. 1–8.
Brochure entitled "Jacobson Greens King IV Triplex Greensmower", published by the Jacobsen Division of Textron Inc. in 1990, pp. 1–6.
Brochure entitled "Lesco, The Lesco 300 Greensmower", published by Lesco Inc. in 1989, pp. 1–4.
Brochure entitled "Ransomes GT Champion" published by Ransomes Inc. in 1991, pp. 1 and 2.

Primary Examiner—David J. Bagnell

[57] ABSTRACT

A mechanism coupling a yoke and cutting unit to a push arm, and having an upright steering pivot mechanism which establishes a relatively large effective steering lever arm for decreasing scuffing of the turf by the rollers of the cutting units, and an inclined pivot mechanism having an axis which is directed generally toward the cutting unit to decrease the effective lever arm between the rollers and the pivot axis and thereby reduce turf scuffing during execution of turns during mowing operations.

22 Claims, 3 Drawing Sheets

PIVOT MECHANISM FOR REEL MOWER CUTTING UNITS

BACKGROUND OF THE INVENTION

This invention relates to reel type mowers and the connection mechanisms which couple them to powered vehicles.

Conventional reel type cutting units are used to mow golf course greens and other areas where relatively precise and accurate mowing is desirable Reel type mowers typically include front and rear rollers which support the cutting units above the ground The height at which the cutting reel is fixed above the rollers determines the height of cut. An arm and yoke typically extend between the cutting unit and the vehicle for dragging the cutting unit along the surface of the ground.

A pivot mechanism is typically provided as a coupling between the yoke and arm for allowing the yoke and cutting unit thereattached to pivot and shift with respect to the arm and vehicle. These conventional pivot mechanisms often include a horizontally and longitudinally extending pivot shaft for allowing the yoke and cutting unit to pivot about a horizontal axis, thereby allowing the cutting unit to evenly engage and roll across the surface of the ground as the cutting unit encounters side slopes. Conventional pivot mechanisms also typically include a vertically extending steering shaft about which the yoke pivots from side to side for swinging the cutting units laterally as the vehicle executes a turn. The swinging of the cutting units during a vehicle turn generally allows the cutting units to follow or steer behind the pivot mechanism, thereby allowing the rollers to roll properly across the ground instead of dragging or skidding sideways. Scuffing or other damage to the ground is thereby reduced by the cutting unit's ability to steer or be pulled behind the yoke's connection to the arm.

Although conventional pivot mechanisms help reduce scuffing, the reel mower units can still scuff the ground undesirably in areas such as golf course greens where turf is highly manicured. During execution of a turn during mowing operations the inside lateral edge portion of the cutting unit can skid laterally and tends to dip down or dig into the turf, thereby often causing excessive turf damage.

Therefore, it would be desirable to provide a mechanism for coupling a reel mower to a vehicle and which reduces or eliminates turf damage occurring during execution of a turn during mowing operations

SUMMARY OF THE INVENTION

The preferred embodiment of the present invention provides a pivot mechanism couplable between a yoke and a push arm of a powered vehicle. An upright pivot mechanism is provided which allows the yoke and cutting unit thereattached to swing or pivot from side to side about a generally upright axis to properly steer behind the pivot mechanism when the vehicle makes a turn. The upright axis of the steering pivot mechanism is spaced a substantial distance forwardly from the rollers which support the cutting unit during mowing operations. The effective lever arm between the rollers and the upright pivot axis is relatively large, thereby reducing the amount of force required to pivot the cutting unit during a turn, which correspondingly reduces the lateral resistance forces encountered at the rollers during turns. Scuffing or other turf damage is thereby decreased. An inclined pivot mechanism is also provided, and includes an inclined axis which extends downwardly and rearwardly proximate the cutting unit's rollers for decreasing the effective lever arm between the inclined pivot axis and the lateral ground forces applied to the cutting unit at the rollers. The smaller lever arm acts to reduce the moment which causes the lateral edges of the cutting unit to dip or dig down into the turf during execution of a turn during mowing operations.

DESCRIPTION OF THE PREFERRED EMBODIMENT

Figure 1:
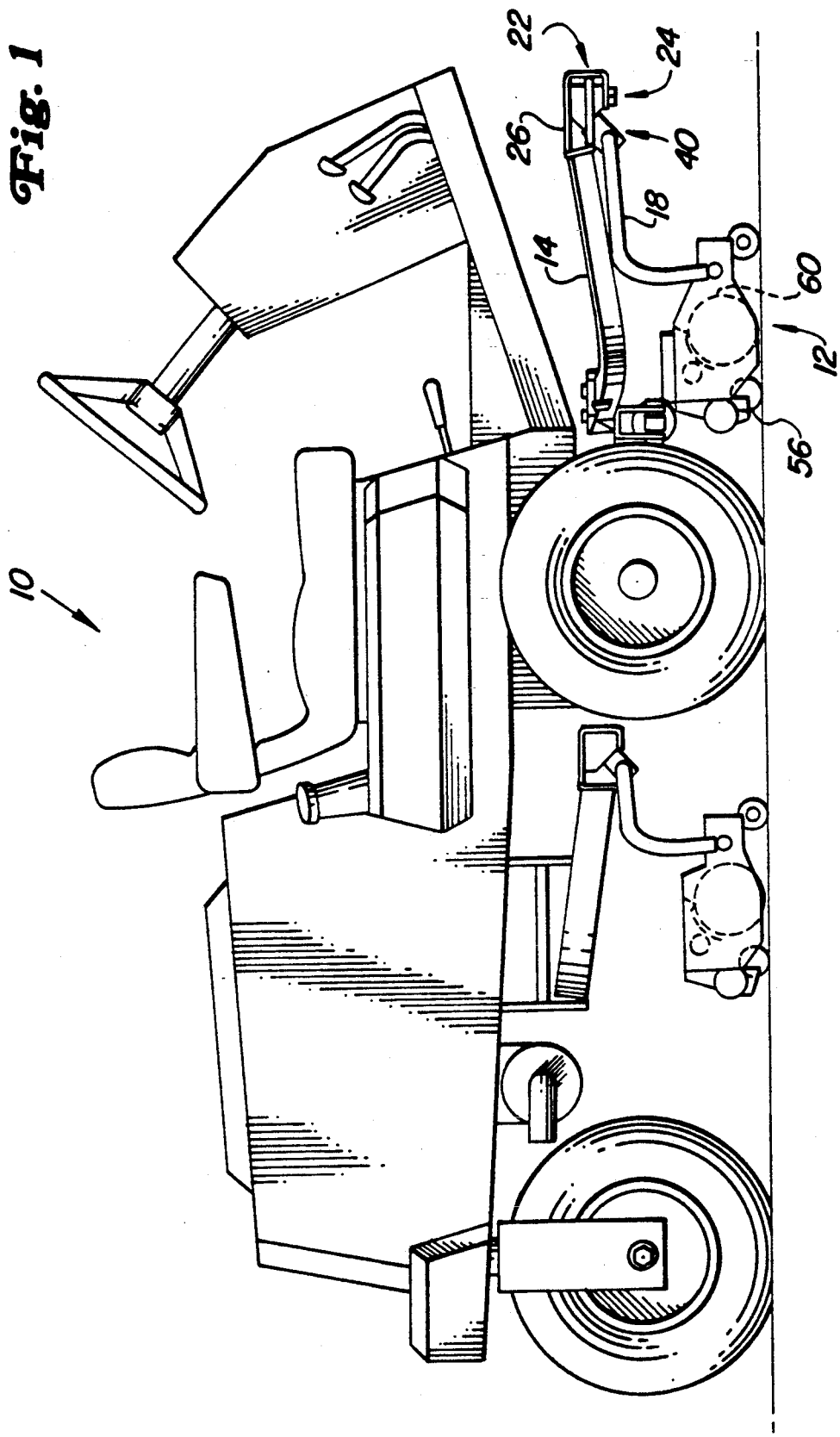
FIG. 1 is a side elevation view of a powered vehicle having the preferred embodiment of the present invention coupled to the front portion thereof.
Figure 2:
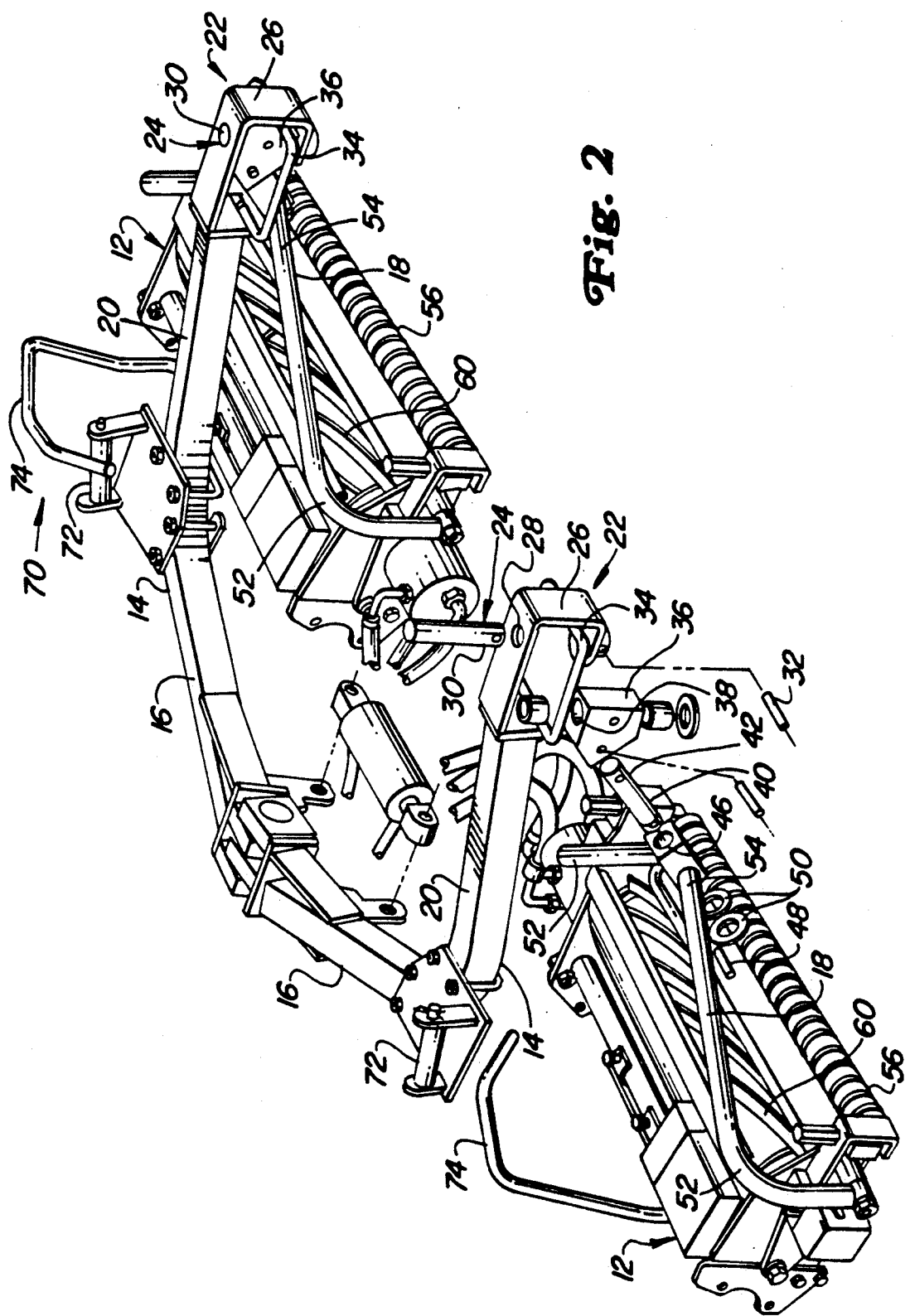
FIG. 2 is a perspective view of the preferred embodiment of the present invention coupled between the front of the powered vehicle shown in FIG. 1 and a reel mower cutting unit. The direction of forward travel is to the right, and the pivot mechanism in the lower left of FIG. 2 is shown exploded.

Referring now to FIGS. 1 and 2, there is shown the preferred embodiment of the present invention as coupled to the front portion of a powered vehicle 10 for mounting a plurality of reel mower cutting units 12 thereto. Respective push arms 14 extend generally forwardly from the front portion of the vehicle 10 to be operatively coupled with the cutting units 12. The rear end portions 16 of the push arms 14 are pivotally coupled with the vehicle 10. A yoke 18 extends rearwardly from the front end portion 20 of each push arm 14. A cutting unit 12 is pivotally coupled to the rear portion 16 of each yoke 18. A pivotal coupling mechanism 22 described in greater detail below serves as a coupling between the yoke 18 and the push arm 14.

Figure 3:
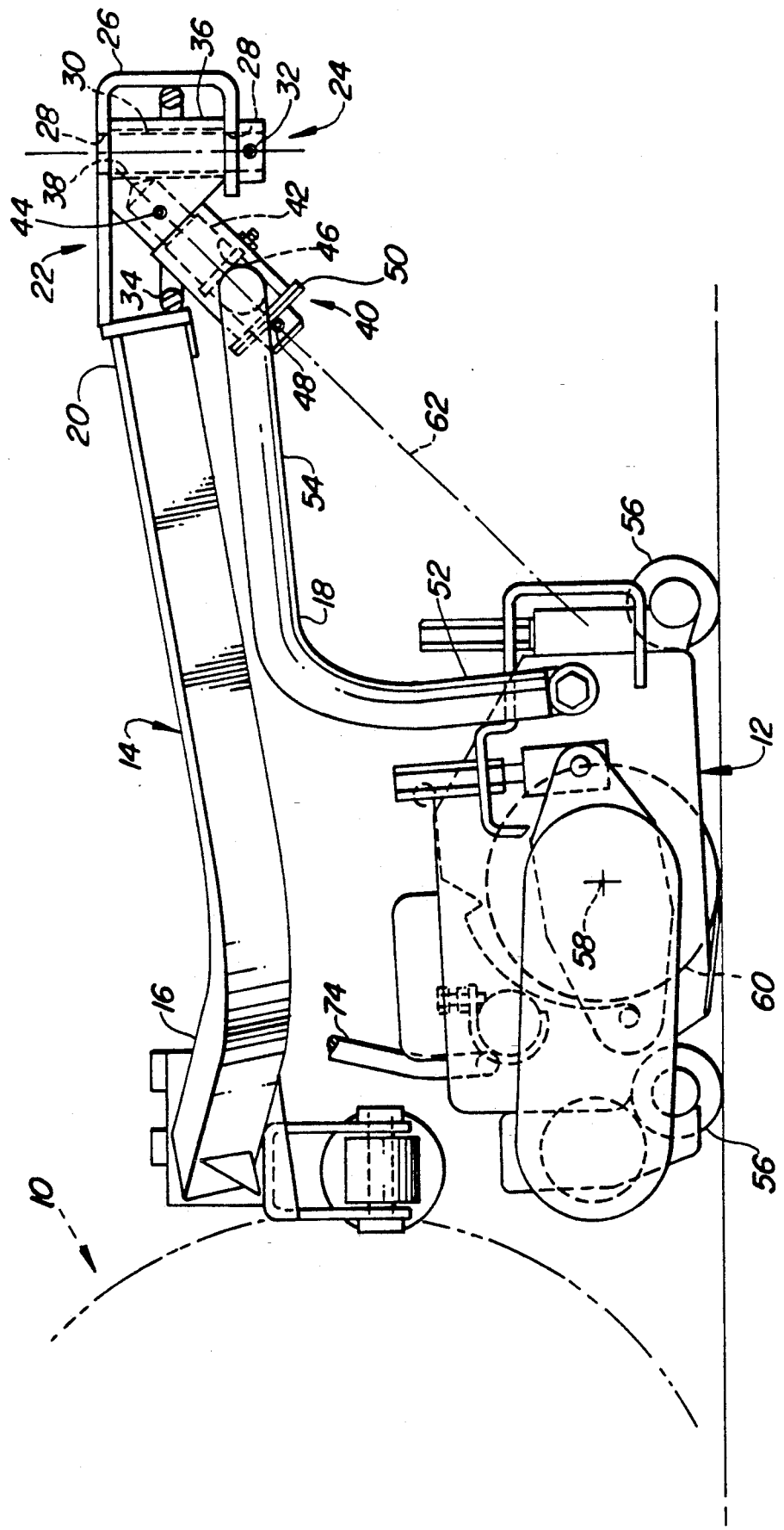
FIG. 3 is a side elevation view of the push arm, pivot mechanism, yoke and cutting unit shown on the left in FIG. 2.

As best seen in FIGS. 2 and 3, the pivotal coupling mechanism 22 according to the preferred embodiment of the present invention provides an upright steering pivot means 24. A bracket 26 fixed to the front end portion 20 of the push arm 14 provides a pair of openings 28 within which an upright steering shaft 30 is received. A pin 32 secures the steering shaft 30 in place within the openings 28. A wire-like member 34 is coupled to the bracket 26 for generally rigidifying and strengthening the bracket 26. A pivot member 36 is provided which includes a generally vertically extending opening 38 which receives the upright steering shaft 30. The pivot member 36 pivots about the generally vertical axis of the upright steering shaft 30. The pivot member 36 and the upright shaft 30 act as an upright steering pivot means 24 for allowing the cutting unit 12 to follow or steer behind the front portion 20 of the push arm 14 during execution of a vehicle turn.

An inclined pivot means or inclined pivot mechanism 40 is also provided by the pivotal coupling mechanism 22. An inclined shaft 42 is received by the pivot member 36 and is held in place by a pin means 44. The yoke 18 defines an inclined central opening 46 which pivotally receives the inclined shaft 42. A pin 48 and washers 50 secure the inclined shaft 46 within the central opening 46. The yoke 18 includes a rear portion 52 which is longitudinally spaced from the front portion 54 of the yoke 18 a substantial distance. The rear portion 52 of the yoke 18 is pivotally coupled with the reel mower cutting unit 12. The inclined shaft 42 and central opening 46 in the yoke 18 provide an inclined pivot means 40 which allows the cutting unit 12 to tilt to either side such that the cutting unit's rollers 56 remain properly engaged against the ground when side slopes are encountered.

A leveling mechanism 70 as best seen on the right in FIG. 2 extends between the central rear portion of each cutting unit 12 and a respective push arm 14. Push arm rollers 72 shift upwardly with respective push arms 14 when the cutting units 12 are raised for transport. As the cutting units 12 are raised, the push arm rollers 72 engage bail members 74 which are coupled with the central rear portion of respective cutting units 12. The engagement of the push arm rollers 72 against the underside of the bail members 74 acts to lift the rear portions of the cutting units 12 in generally level fashion with the front portions of the cutting units 12. Removable grass catching baskets can be coupled to the front portion of the cutting units for collecting grass clippings, but are not shown in the Figures for the sake of clarity.

Next, the operation of the present invention will be discussed. Reel mower cutting units turn or follow their pivotal connection with a vehicle during a turn when a moment of particular magnitude is imparted to the cutting unit. A moment is the tendency of an object to swing about an axis when a force is applied to the object at a distance from the axis. The distance at which a force is applied to swing or pivot an object is referred to as a moment arm or lever arm. The longitudinal length of the yoke 18 of the preferred embodiment of the present invention acts as a moment arm or lever arm through which a force is applied to turn or steer the cutting unit 12 during a vehicle turn. During such a vehicle turn, the force is applied to the front portion of the yoke, which causes the yoke and cutting unit to pivot. Since the yoke 18 extends a relatively large distance longitudinally, the effective lever arm or moment arm established for steering or swinging the cutting unit 12 is relatively large. Therefore, the amount of force applied to the front portion 54 of the yoke 18 which is required to create a moment of sufficient magnitude to steer or swing the cutting unit 12 laterally is relatively small. As the lateral turning force is applied to the front portion 54 of the yoke 18 during a vehicle turn, an opposite laterally directed force is imparted to the rollers 56 by resistance with the ground. It is this lateral resistance between the rollers 56 and the ground which contributes to scuffing of the turf. However, since the force required to steer or turn the cutting unit 12 is reduced by the longer lever arm of the present invention, the lateral forces encountered by the rollers 56 due to ground resistance will be correspondingly reduced. Scuffing is thereby reduced by providing a longer effective lever arm for turning the cutting units 12.

In other words, if the longitudinal dimension between the upright steering shaft 30 and the cutting unit 12 were shorter, as is the case with many conventional reel mower mechanisms, then the effective lever arm would be smaller and the force that would have to be imparted to the front of the yoke in order for a moment of sufficient magnitude to be imparted to the cutting unit for steering the cutting unit would be larger. This larger lateral force would be resisted by a generally equal and opposite force at the contact between the ground and the rollers. This resistance force would therefore be larger than if a longer lever arm as shown in FIGS. 1 and 2 were utilized, and the scuffing of the turf would be correspondingly and undesirably increased due to the presence of a shorter lever arm. Therefore, the larger longitudinal dimension of the yoke 18 according to the preferred embodiment of the present invention acts to decrease the scuffing of the ground at the cutting unit's rollers 56.

The particular embodiment shown in FIGS. 1-3 provides a yoke 18 which extends rearwardly to establish a horizontal spacing of about 305 mm between the upright steering shaft 30 and the point at which the yoke 18 is coupled with the cutting unit 12. A horizontal spacing of about 257 mm is established between the upright steering shaft 30 and the axis of the front roller 56. The horizontal distance between the upright steering shaft 30 and the axis 58 of the cylindrical cutting reel 60, as best seen in FIG. 3, is 411 mm.

The inclined pivot means 40 of the preferred embodiment also acts to reduce turf scuffing during vehicle turns. As discussed earlier, conventional reel mowers often provide a horizontally and longitudinally extending pivot axis about which a yoke and cutting unit pivot to maintain proper ground contact when the cutting unit encounters side slopes. The laterally directed ground resistance forces encountered by the rollers during a turn act to pivot the cutting unit about these conventional horizontal pivot mechanisms, thereby forcing the edge of the cutting unit which is on the inside of the turn downwardly into the ground, and lifting the edge of the cutting unit which is on the outside of the turn off the ground. On conventional reel mowers, the height of a horizontal pivot axis above the rollers establishes a relatively large moment arm or lever arm such that the moment which forces the edge of the cutting unit down into the ground is relatively large. An undesirable amount of scuffing can therefore be caused by conventional pivot mechanisms.

The present invention provides a pivot axis 62 which is inclined to extend proximate the rollers 56 such that the effective moment arm or lever arm between the laterally directed ground resistance forces and the inclined pivot axis 62 is relatively small. Since the effective lever arm is relatively small, the moment which urges or forces the cutting unit 12 to pivot about the inclined shaft 42 is relatively small. The inside lateral edge of the cutting unit 12 during a turn is therefore forced downwardly against the ground to a lesser extent than if a horizontal pivot shaft were utilized, since the effective lever arm according to the present invention is smaller.

As seen in FIG. 3, the present invention provides an inclined pivot axis 62 which extends downwardly and rearwardly toward the cutting unit 12 at approximately a forty-five degree (45°) angle. More particularly, the inclined pivot axis 62 extends between the front and rear rollers 56.

The present invention acts to reduce the lateral ground resistance forces encountered by the rollers 56 during execution of a turn due to the longer effective lever arm established between the upright steering shaft 30 and the cutting unit rollers 56. Since smaller lateral forces are experienced by the rollers 56, the cutting unit 12 has less tendency to pivot about the inclined shaft 42, and the tendency of the inside edge of the cutting unit 12 to dig into the ground is reduced. The inclined shaft 42 further reduces the negative effects of the lateral ground forces. The axis 62 of the inclined pivot shaft 42 extends proximate the rollers 56 such that a relatively small effective lever arm is established. Therefore, the lateral ground forces—which are applied to the rollers 56 and are relatively small due to the operation of the longer lever arm between the cutting unit 12 and the upright shaft 30—are applied with a smaller effective lever arm. The tendency for the cutting unit 12 to swing about the inclined pivot axis 62 is thereby reduced due to the smaller lever arm. The cutting unit's lateral edge which is on the inside during a vehicle turn therefore dips or digs into the ground less aggressively. It is apparent then, that the preferred embodiment of the present invention reduces scuffing of the turf by the combined effect of two methods: first by providing a substantially lengthened effective lever arm between the upright steering pivot axis and the cutting unit 12, and second by providing a shortened effective lever arm between the cutting unit 12 and the inclined pivot axis 62.

I claim:

1. A mechanism for coupling a ground engaging cutting unit with a vehicle, comprising:
    an inclined pivot mechanism having an axis and being coupled between the cutting unit and the vehicle for allowing the cutting unit to pivot about the axis as uneven ground conditions are encountered, said axis being inclined and extending downwardly and rearwardly generally toward the cutting unit, and
    wherein said axis of the inclined pivot mechanism extends proximate the cutting unit's engagement with the ground for reducing te tendency of lateral edges of the cutting unit to press downwardly against the ground during execution of a turn.

2. The invention of claim 1, wherein the axis extends between front and rear rollers of the cutting unit.

3. The invention of claim 1, wherein the axis extends at approximately a forty-five degree angle.

4. The invention of claim 1, wherein:
    the cutting unit further includes front and rear roller means which engage the ground.

5. A mechanism for coupling a ground engaging cutting unit with a vehicle, said cutting unit including lateral edge portions and front and rear roller means, said mechanism comprising:
    an inclined pivot mechanism having an axis and being coupled between the cutting unit and the vehicle for allowing the cutting unit to pivot about said axis as the cutting unit encounters side slopes, said axis being inclined and extending downwardly and rearwardly toward the cutting unit and between the front and rear roller means for reducing the tendency of the lateral edge portions of the cutting unit to press downwardly against the ground during execution of a turn.

6. A mechanism for coupling a cutting unit with a vehicle, said cutting unit including front and rear ground engaging rollers and lateral edge portions, said mechanism comprising:
    a yoke means coupled with the cutting units,
    an inclined pivot means coupled between the yoke means and the vehicle for allowing the yoke and cutting unit thereattached to pivot with respect to the vehicle as side slopes are encountered, said inclined pivot means having an inclined axis of pivot which extends downwardly and rearwardly generally toward the cutting unit for reducing the tendency of the lateral edge portions of the cutting unit to press downwardly against the ground during execution of a turn.

7. The invention of claim 6, wherein the axis extends generally between the front and rear roller means.

8. The invention of claim 6, wherein the yoke means includes a front portion coupled with the inclined pivot means and a rear portion longitudinally spaced from the front portion and coupled with the cutting unit.

9. A mechanism for coupling a ground engaging cutting unit with a vehicle, comprising:
    a generally upright steering pivot means operatively carried by the vehicle, and to which the cutting unit is operatively coupled, said upright steering pivot means having a generally upright axis about which the cutting unit may swing laterally as the vehicle executes a turn, said upright axis being spaced a substantial distance forward from the cutting unit, and
    an inclined pivot means for allowing the cutting unit to pivot laterally about the axis as uneven ground conditions are encountered, said inclined pivot means having a pivot axis which extends downwardly and rearwardly generally toward the cutting unit.

10. The invention of claim 9, wherein the axis of the inclined pivot extends between front and rear rollers of the cutting unit.

11. The invention of claim 9, wherein the axis of the inclined pivot extends at approximately a forty-five degree angle.

12. The invention of claim 9, wherein the axis of the inclined pivot means extends proximate the cutting unit for reducing the distance between the axis and front and rear rollers for reducing the tendency of lateral edges of the cutting unit to press downwardly against the ground during execution of a turn.

13. The invention of claim 9, and further comprising a yoke having a front portion operatively coupled with the upright steering pivot means and the inclined pivot means, said yoke having a rear portion longitudinally spaced a substantial distance from the front portion of the yoke and operatively coupled with the cutting unit.

14. The invention of claim 9, wherein the inclined pivot means is coupled with the upright steering means for swinging laterally about the axis of the upright pivot means.

15. The invention of claim 9, wherein:
    the upright steering pivot means further includes a pivot member pivotable about the generally upright axis, and
    said inclined pivot means is coupled with the pivot member for swinging about the upright axis with the pivot member.

16. The invention of claim 9, further comprising:
    a generally upright shaft means,
    a pivot member having a first opening for receiving the upright shaft, said pivot member being pivotable about the upright shaft,
    an inclined shaft extending downwardly and rearwardly from the pivot member, and
    a yoke means coupled with the cutting unit, said yoke means including an inclined opening for receiving the inclined shaft, said yoke and cutting unit being pivotable about the inclined shaft.

17. A mechanism for coupling a ground engaging cutting unit with a vehicle, said cutting unit including lateral edge portions and front and rear roller means, said mechanism comprising:

a generally upright steering pivot means operatively carried by the vehicle and spaced a substantial distance forward of the cutting unit for allowing the cutting unit to swing laterally about and generally follow the steering pivot when relatively small lateral ground forces are encountered by the front and rear roller means as the vehicle executes a turn and for reducing lateral forces encountered by the front and rear roller means during a turn, and an inclined pivot means operatively coupled between the cutting unit and the vehicle for allowing the cutting unit to pivot about said axis as side slopes are encountered, said inclined pivot means having a pivot axis extending downwardly and rearwardly between the front and rear rollers for reducing the tendency of the lateral edge portions of the cutting unit to press downwardly against the ground during execution of a turn.

18. The invention of claim 17, and further comprising a yoke having a front portion operatively coupled with the upright steering pivot means and the inclined pivot means, said yoke having a rear portion longitudinally spaced a substantial distance from the front portion of the yoke and operatively coupled with the cutting unit.

19. The invention of claim 18, wherein the axis of the inclined pivot extends at approximately a forty-five degree angle.

20. A mechanism for coupling a ground engaging cutting unit with a vehicle, comprising:

an inclined pivot mechanism having an axis and being coupled between the cutting unit and the vehicle for allowing the cutting unit to pivot about the axis as uneven ground conditions are encountered, said axis being inclined and extending downwardly and rearwardly generally toward the cutting unit, and wherein the axis extends between front and rear rollers of the cutting unit.

21. A mechanism for coupling a ground engaging cutting unit with a vehicle, comprising:

an inclined pivot mechanism having an axis and being coupled between the cutting unit and the vehicle for allowing the cutting unit to pivot about the axis as uneven ground conditions are encountered, said axis being inclined and extending downwardly and rearwardly generally toward the cutting unit, and wherein said axis extends at approximately a forty-five degree angle.

22. A mechanism for coupling a ground engaging cutting unit with a vehicle, comprising:

an inclined pivot mechanism having an axis and being coupled between the cutting unit and the vehicle for allowing the cutting unit to pivot about the axis as uneven ground conditions are encountered, said axis being inclined and extending downwardly and rearwardly generally toward the cutting unit, wherein the cutting unit further includes front and rear roller means, and the axis of the inclined pivot mechanism extends proximate the cutting unit to reducing the distance between the axis and the front and rear rollers for reducing the tendency of lateral edges of the cutting unit to press downwardly against the ground during execution of a turn.

* * * * *